Nov. 26, 1940.  W. OWEN  2,223,124
METHOD AND APPARATUS FOR BENDING AND CASE HARDENING GLASS SHEETS
Filed July 19, 1938  2 Sheets-Sheet 1
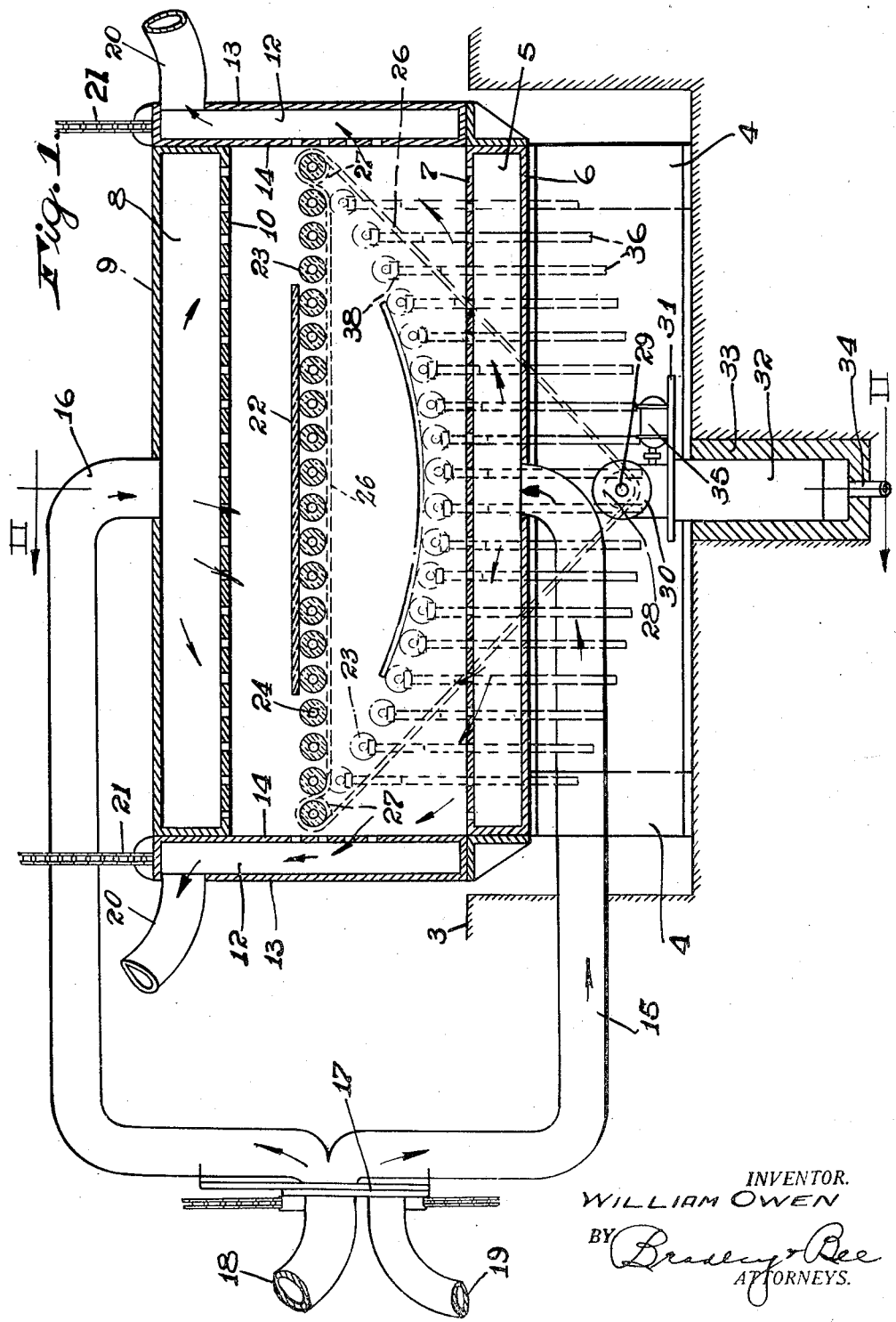
INVENTOR.
WILLIAM OWEN
BY Bradley & Bee
ATTORNEYS.

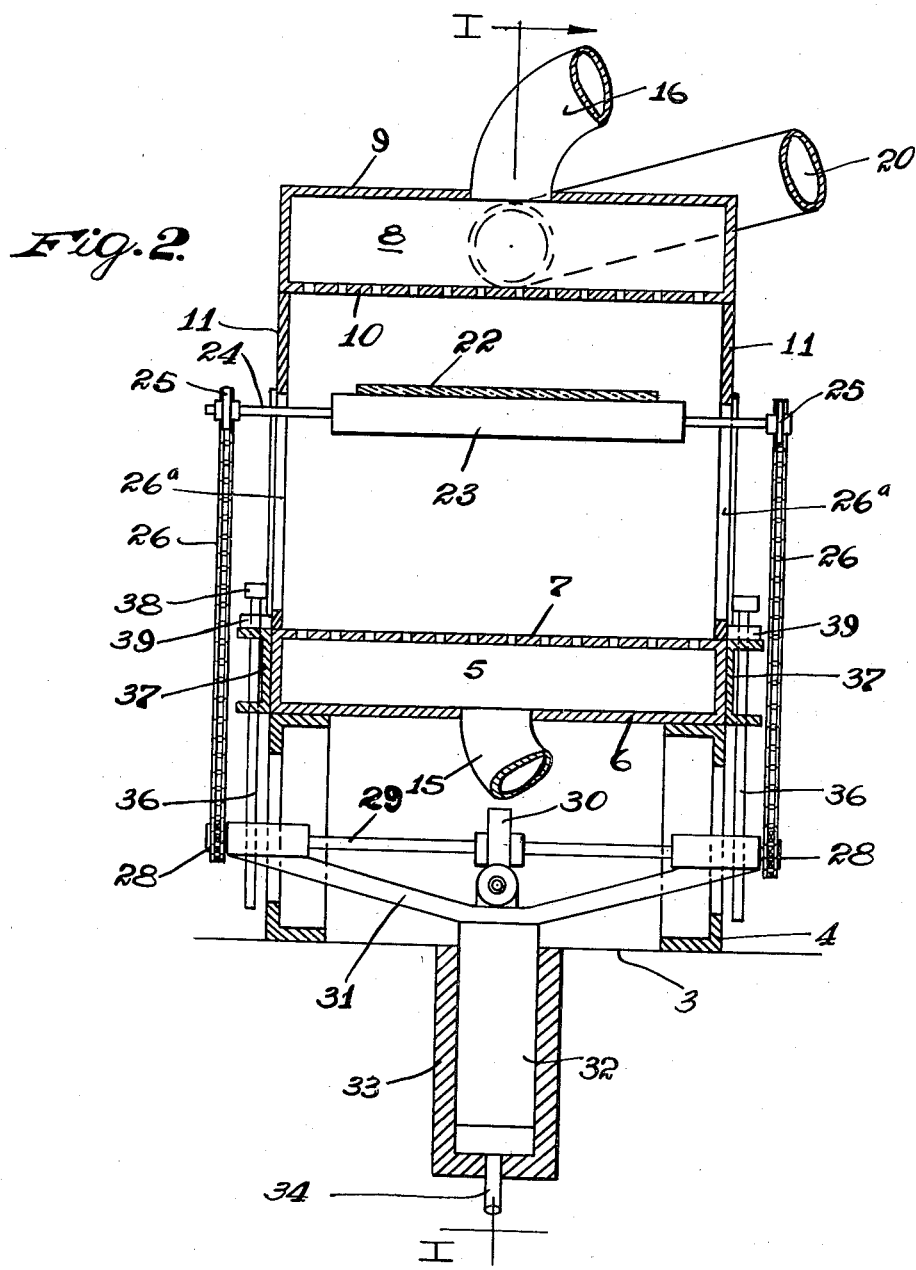

Patented Nov. 26, 1940

2,223,124

UNITED STATES PATENT OFFICE 2,223,124

METHOD AND APPARATUS FOR BENDING AND CASE HARDENING GLASS SHEETS

William Owen, Pittsburgh, Pa., assignor to Pittsburgh Plate Glass Company, Allegheny County, Pa., a corporation of Pennsylvania Application July 19, 1938, Serial No. 220,051

8 Claims. (Cl. 49—1)

The invention relates to a method and apparatus for bending and case hardening glass sheets, and particularly sheets of thick glass, although applicable for use with glass of any thickness. The invention has for its principal objects the provision of an improved method and apparatus which can be used to produce curved sheets having any degree of curvature desired, and which will function to bend and harden the sheets without marring them and without the use of the supporting tongs heretofore employed which leave the marks of the tongs at the points of suspension. A further object is the provision of an apparatus which is easily operated and insures the treatment of the glass without danger of breakage. One embodiment of the invention is illustrated in the accompanying drawings, wherein:

Figure 1 is a vertical section on the line I—I of Fig. 2. And Figure 2 is a vertical section on the line II—II of Fig. 1.

The casing of the apparatus in which the heating and chilling occurs is preferably of rectangular cross section and is mounted in the recesses of the floor 3 upon a pair of castings 4, 4 of channel shape. The bottom wall of the casing is in the form of the chamber 5 having the outer wall 6 and the inner wall 7 which is perforated throughout as indicated in the drawings. The top wall of the casing comprises a chamber 8 having the outer wall 9 and the inner wall 10 which is perforated throughout. The side walls 11, 11 are in the form of plates, as shown (Fig. 2), while the end walls are in the form of hollow gates comprising the chambers 12, 12 having outer walls 13, 13 and inner walls 14, 14 which are perforated at their central portions as shown. A pair of pipes 15 and 16 lead to the chambers 5 and 8 respectively and approach each other at their outer ends to form a common inlet, at which point a vertically movable gate 17 is provided to which are connected fluid supply pipes 18 and 19, such supply pipes being of flexible material to permit their ready movement up and down. When the gate is in the position shown, the pipe 18 is connected to both of the pipes 15 and 16. The pipe 18 supplies a mixture of gas and air and when the gate is in the position illustrated, a mixture of gas and air is supplied to the chambers 5 and 8. This mixture passes through the perforations in the plates 7 and 10 and gives the heat on the interior of the casing necessary for bending the glass sheet and case hardening it. When the gate 17 is moved upward from the position shown, the pipe 18 is brought out of registration with the common inlet at the junction of the pipes 15 and 16 and the end of pipe 19 is brought into registration with this common inlet. The pipe 19 supplies the air necessary for the chilling operation and with the parts in the position last stated, the cooling air is supplied to the chambers 5 and 8 and flows through the walls 7 and 10, thus chilling the glass sheet which has been heated and bent to the desired curvature. During the heating operation, the exhaust gases from the casing pass into the hollow gates 13, 13 and are exhautsed through the flexible pipes 20, 20 leading to the stack, the gates 13, 13 being mounted for vertical movement and operated by chains 21, 21 which pass around a suitable raising and lowering means. The gates 13, 13 are preferably opened during the chilling operation.

The glass sheet 22, which is to be bent, is supported on a runway consisting of the spaced horizontal rolls 23 which are preferably covered with asbestos to reduce any tendency to mar the surface of the glass sheet. These rollers are each provided with a shaft 24 (Fig. 2) and each carries at its ends the sprockets 25, 25. The side plates 11, 11 of the casing are slotted, as indicated at 26a, to permit of the vertical movement of the shafts in the bending operation, as later described. The rolls are supported by a pair of sprocket chains 26, 26 which extend around idler sprockets 27, 27 supported on the side plates of the casing and around a pair of drive sprockets 28, 28 carried by a drive shaft 29. When the drive sprockets 28 are in the position shown in Fig. 1, the upper flights of the chains 26, 26 are substantially horizontal, so that the axes of the rolls 23 lie in approximately a horizontal plane.

The drive shaft 29 extends through a reducer 30 mounted on a yoke-shaped platform 31 in the recess below the casing. This platform is carried by the plunger 32 mounted in the cylinder 33 and comprises a hydraulic lift whereby the platform may be raised and lowered, a supply connection 34 for fluid being connected to the lower end of the cylinder and provided with a three-way valve for regulating the up and down movement of the plunger and the parts carried thereby. The platform 30 also carries an electric motor 35 which drives the shaft 29 through the intermediary of the reducer 30.

In using the apparatus, the glass plate 22 is placed upon the roller runway which occupies the position shown in full lines in Fig. 1. The casing is now heated by the combustion of the gas mixture supplied from the chambers 5 and 8 and the glass sheet is heated to the bending point, which is approximately 1100 deg. F. This is also the temperature at which the glass may be chilled to case harden it. When the glass arrives at this bending temperature, the bending operation is started by supplying fluid to the cylinder 33 so as to gradually raise the platform 31 and the parts carried thereby. As the shaft 29 moves up, slack is provided in the sprocket chains 26, 26 and the rolls of the runway move down thus causing the glass sheet carried thereby to bend by gravity. This movement is continued until the rollers of the runway reach the position shown in dotted lines in Fig. 1, at which time their peripheries which support the glass plate define the curvature to which it is desired to bend the glass plate. Although the glass sheet 22 will then have assumed an arcuate form, it will still remain substantially horizontally supported. The downward movement of each of the rollers of the runway is limited by means of the stop rods 36 mounted for sliding movement in the brackets 37 (Fig. 2) at the sides of the casing. These rods are provided with heads 38 for engaging the shafts 24 of the rollers and the adjustment of the rods to proper position is accomplished by means of the nuts 39 which are carried on the brackets 37. By a proper adjustment of the stops, the downward movement of the rolls may be changed so as to give any desired degree of curvature to the plate carried on the runway. The apparatus is thus easily adjustable to permit the bending of sheets of widely varying curvature.

During the downward movement of the roller runway, the rolls thereof are kept in motion in order to prevent any marring of the lower surface of the plate 22. This is accomplished by the use of the motor 35 which is of the reversing type, the rolls being rotated in one direction for a few rotations and then rotated in the reverse direction due to the reversal of the motor. This may be accomplished by a switch which is either manually operated or operated automatically to give the reversals at proper intervals. The glass plate is, therefore, kept moving back and forth along the runway during the period at which it is at a temperature at which it might otherwise be marred. When the runway reaches its lower limit of movement, the gate 17 is shifted so as to bring the pipe 18 out of registry with the pipes 15 and 16 and the air supply 19 is brought into registry with the pipes 15 and 16. The chilling operation now occurs due to the application of the blasts of air to the sheet from the chambers 5 and 8. It is necessary during this period to keep the glass sheet 12 in motion so that the air may be applied uniformly over the lower surface of the sheet which would otherwise be shielded by the rolls so that an uneven application of air would result. The application of air is continued until the surface of the glass is chilled and case hardened, the gates 13, 13 being preferably open at this time, after which the plunger 32 is operated to bring the runway supporting the glass sheet to its original position. On opening the gates 14, 14 the glass may be easily moved out of the casing either by grasping it with a suitable gripping means or by rotating the rolls 23 in one direction, and removing the bent sheet. The air blasts are shown as applied through perforations in the plates 7 and 10, but if desired, outlets or nozzles of any desired shape may be used in connection with the perforations.

What I claim is:

1. A method of bending and case hardening a glass sheet which consists in supporting it on the rolls of a horizontal roller runway, heating the sheet to the softening point, causing the runway to sag so that the peripheries of the rolls engaging the lower surface of the sheet describe the curvature to which it is desired to bend the sheet, applying blasts of air to the opposite sides of the sheet after it is bent, and during the bending and chilling steps rotating the rolls back and forth to maintain the sheet in motion.

2. Apparatus for bending and case hardening a glass sheet comprising a runway for carrying the sheet made up of a series of spaced horizontal rolls mounted for guided vertical movement, means for supporting the rolls so that they may be shifted downward from a starting position in which their axes are in substantially the same horizontal plane to a final bending position in which the axes of the rolls define the desired curvature to which the glass sheet is to be bent, means for heating the sheet to bending temperature, means for securing a gradual movement of the rolls from starting to final bending position when the temperature of the sheet reaches the bending point, means for rotating the rolls alternately back and forth during their movement downward to final bending position and after their arrival at such position in order to keep the sheet moving back and forth along the runway, and means for applying chilling blasts of air to the opposite sides of the sheet after the rolls assume their final bending position.

3. Apparatus for bending and case hardening a glass sheet comprising a runway for carrying the sheet made up of a series of spaced horizontal rolls mounted for guided vertical movement, and provided with sprockets at each end, an endless chain at each end of the rolls having a horizontal flight on which the sprockets are supported, means supporting the chain at its horizontal flight, a drive sprocket for each chain mounted for vertical movement and adapted by its upward movement to permit the horizontal flight of the chain to sag so that the rolls carried thereby conform to the curvature to which the glass sheet is to be bent, means for moving the drive sprockets vertically, means for rotating the drive sprockets alternately backward and forward, means for heating the glass sheet on the runway to the softening point, and means for applying blasts of air to the opposite sides of the sheet after it has been bent.

4. Apparatus for bending and case hardening a glass sheet comprising a runway for carrying the sheet made up of a series of spaced horizontal rolls mounted for guided vertical movement, and provided with sprockets at each end, an endless chain at each end of the rolls having a horizontal flight on which the sprockets are supported, means supporting the chain at its horizontal flight, a drive sprocket for each chain mounted for vertical movement and adapted by its upward movement to permit the horizontal flight of the chain to sag so that the rolls carried thereby conform to the curvature to which the glass sheet is to be bent, a motor for rotating the drive sprockets alternately backward and forward, means for moving the motor and drive sprockets vertically, means for heating the glass sheet on the runway to bending temperature, and means for applying blasts of air to the opposite sides of the sheet after it has been bent.

5. Apparatus for bending and case hardening a glass sheet comprising a casing having a double wall top and bottom to provide a pair of opposing horizontal chambers with the inner wall of each chamber perforated throughout, a horizontal runway intermediate the chambers for carrying the glass sheet made up of a series of spaced horizontal rolls guided for vertical movement, means for supporting the rolls so that they may be shifted downward from a starting position with their axes in substantially the same horizontal plane to a final bending position in which the axes of the rolls define the desired curvature to which the glass sheet is to be bent, gas and air supply means leading to the two chambers for securing combustion in the casing to heat the sheet to bending temperature, means for securing a gradual movement of the rolls from starting to final bending position when the glass arrives at bending temperature, means for rotating the rolls alternately back and forth during their movement to final bending position and after their arrival at such position, and means whereby the supply of gas and air to said chamber is discontinued and a flow of cooling air substituted therefor after the rolls assume their final bending position.

6. A method of bending glass which comprises supporting a glass sheet substantially horizontally in rolling relation along its lower surface, imparting relative oscillatory motion between the glass sheet and its support in a rolling action, heating the glass sheet to softening temperature during the oscillatory motion, and further supporting the glass sheet along arcs of progressively decreasing radii while continuing the oscillatory rolling action until the glass assumes a predetermined arcuate form.

7. A method of bending glass which comprises supporting a glass sheet substantially horizontally in a rolling action along areas distributed substantially over the lower surface of the glass, imparting relative oscillatory motion between the glass sheet and its support in a rolling action, heating the glass sheet to softening temperature during the oscillatory motion, and further supporting the glass along arcs of progressively decreasing radii while continuing the oscillatory rolling action until the glass assumes a predetermined arcuate form.

8. A method of bending glass which comprises supporting a glass sheet substantially horizontally in a rolling action along its lower surface, heating the glass to softening temperature until it tends to sag under its own weight, imparting relative oscillatory rolling action between the glass sheet and its rolling support, supporting the glass sheet along arcs of progressively decreasing radii at a rate corresponding substantially to the rate of sagging of the glass sheet under the influence of the softening heat, and while continuing the oscillatory rolling action until the glass sheet assumes a predetermined arcuate form.

WILLIAM OWEN.